United States Patent
Nelson et al.

(10) Patent No.: US 10,143,919 B2
(45) Date of Patent: Dec. 4, 2018

(54) DYNAMIC PHYSICAL AGENT FOR A VIRTUAL GAME

(71) Applicant: Disney Enterprises, Inc., Burbank, CA (US)

(72) Inventors: Robert H. Nelson, Salt Lake City, UT (US); Jeffrey O. Bunker, Cedar Hills, UT (US); Robert R. Lowe, Layton, UT (US)

(73) Assignee: Disney Enterprises, Inc., Burbank, CA (US)

( * ) Notice: Subject to any disclaimer, the term of this patent is extended or adjusted under 35 U.S.C. 154(b) by 215 days.

(21) Appl. No.: 14/705,829

(22) Filed: May 6, 2015

(65) Prior Publication Data

US 2016/0325180 A1  Nov. 10, 2016

(51) Int. Cl.
*A63F 9/24* (2006.01)
*A63F 13/00* (2014.01)
*A63H 30/00* (2006.01)
*A63H 33/00* (2006.01)
*A63F 13/355* (2014.01)
*A63F 13/211* (2014.01)
*A63F 13/215* (2014.01)
*A63F 13/825* (2014.01)
(Continued)

(52) U.S. Cl.
CPC .......... *A63F 13/355* (2014.09); *A63F 13/211* (2014.09); *A63F 13/215* (2014.09); *A63F 13/217* (2014.09); *A63F 13/69* (2014.09); *A63F 13/79* (2014.09); *A63F 13/825* (2014.09); *A63F 13/95* (2014.09); *A63F 13/216* (2014.09); *A63F 13/23* (2014.09); *A63F 13/67* (2014.09); *A63H 2200/00* (2013.01)

(58) Field of Classification Search
CPC ..... A63F 13/211; A63F 13/215–13/217; A63F 13/23; A63F 13/235; A63F 13/355; A63F 13/67; A63F 13/69; A63F 13/79; A63F 13/825; A63F 13/95; A63H 33/26; A63H 2200/00
USPC .................................................. 446/175, 268
See application file for complete search history.

(56) References Cited

U.S. PATENT DOCUMENTS 5,636,994 A * 6/1997 Tong .................... G09B 5/065
 434/308
5,752,880 A * 5/1998 Gabai .................... A63H 30/04
 434/308

(Continued)

*Primary Examiner* — Milap Shah
(74) *Attorney, Agent, or Firm* — Patterson + Sheridan, LLP

(57) ABSTRACT

Systems, methods and articles of manufacture for creating out-of-game objectives for a computer game. Embodiments include determining user identification information identifying a user account within a computer game. Communications with a first physical device are established. In response to an in-game event within the computer game, embodiments configure the first physical device to detect a first out-of-game activity by configuring the first physical device with one or more conditions that are satisfied when data collected using one or more sensors of the first physical device exceeds a defined threshold value, and that, when satisfied, indicate the first out-of-game activity is completed. Upon receiving, from the first physical device, an indication that the out-of-game activity has been completed, embodiments affect one or more gameplay attributes of the computer game for the user account, based on the completed out-of-game activity.

20 Claims, 8 Drawing Sheets

(51) Int. Cl.
  *A63F 13/69*  (2014.01)
  *A63F 13/217*  (2014.01)
  *A63F 13/79*  (2014.01)
  *A63F 13/95*  (2014.01)
  *A63F 13/23*  (2014.01)
  *A63F 13/67*  (2014.01)
  *A63F 13/216*  (2014.01)

(56) References Cited

U.S. PATENT DOCUMENTS

| | | | | |
|---|---|---|---|---|
| 5,766,077 A * | 6/1998 | Hongo | | A63F 13/02 273/148 B |
| 5,853,327 A * | 12/1998 | Gilboa | | A63F 3/00643 273/237 |
| 6,494,762 B1 * | 12/2002 | Bushmitch | | A63H 30/04 434/307 R |
| 6,629,133 B1 * | 9/2003 | Philyaw | | A63H 3/28 446/142 |
| 6,773,325 B1 * | 8/2004 | Mawle | | A63F 13/02 446/175 |
| 6,773,344 B1 * | 8/2004 | Gabai | | A63H 3/28 463/1 |
| 7,645,178 B1 * | 1/2010 | Trotto | | A63H 3/00 446/268 |
| 8,033,901 B2 * | 10/2011 | Wood | | A63F 13/02 206/776 |
| 8,287,372 B2 * | 10/2012 | Hong | | A63F 13/02 463/32 |
| 8,469,766 B2 * | 6/2013 | Zheng | | A63H 3/28 446/175 |
| 8,647,202 B2 * | 2/2014 | Crevin | | A63F 13/04 446/141 |
| 8,858,339 B2 * | 10/2014 | Reiche | | A63F 13/12 446/175 |
| 9,342,186 B2 * | 5/2016 | Forti | | G06F 3/0488 |
| 9,833,695 B2 * | 12/2017 | Yano | | A63F 9/24 |
| 2002/0090985 A1 * | 7/2002 | Tochner | | A63F 13/12 463/1 |
| 2003/0198927 A1 * | 10/2003 | Campbell | | A63H 11/00 434/307 R |
| 2007/0015588 A1 * | 1/2007 | Matsumoto | | A63F 13/06 463/43 |
| 2007/0093170 A1 * | 4/2007 | Zheng | | A63H 3/36 446/268 |
| 2009/0069084 A1 * | 3/2009 | Reece | | A63F 13/10 463/32 |
| 2009/0158210 A1 * | 6/2009 | Cheng | | G06Q 10/10 715/810 |
| 2011/0021109 A1 * | 1/2011 | Le | | A63H 3/28 446/300 |
| 2012/0295510 A1 * | 11/2012 | Boeckle | | A63H 3/28 446/72 |
| 2013/0196766 A1 * | 8/2013 | Leyland | | A63F 9/24 463/36 |
| 2013/0296058 A1 * | 11/2013 | Leyland | | A63F 13/195 463/42 |
| 2014/0227676 A1 * | 8/2014 | Noshadi | | G09B 5/02 434/365 |
| 2015/0133025 A1 * | 5/2015 | Ponomarev | | A63H 3/28 446/484 |
| 2016/0171909 A1 * | 6/2016 | Roozeboom | | G09B 23/00 434/276 |
| 2018/0028904 A1 * | 2/2018 | Burton | | A63F 9/24 |

* cited by examiner

| ACTION DISK DEVICE | 700 |
| --- | --- |
| PROCESSOR | 710 |
| STORAGE | 715 |
| MEMORY | 720 |
|   PHYSICAL GAME COMPONENT | 245 |
|   OPERATION SYSTEM | 730 |
| AUDIO I/O DEVICE(S) | 735 |
| RADIO-FREQUENCY TRANSCEIVER | 740 |
| CAMERA(S) | 745 |
| INFRARED TRANSCEIVER | 750 |
| ACCELEROMETER | 755 |
| LIGHT-EMITTING DEVICE | 760 |

FIG. 7

DYNAMIC PHYSICAL AGENT FOR A VIRTUAL GAME

BACKGROUND

Field of the Invention

The present invention generally relates to home entertainment, and more specifically to techniques for extending a computer game into a physical environment.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

Many hand-held gaming devices include some form of camera device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

While video games allow the user to interact directly with the video game system, such interactions primarily influence the graphical depiction shown on the video game device (or on a connected display), rather than physical objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur). As such, the interactions between conventional physical and virtual worlds are limited.

SUMMARY

One embodiment provides a non-transitory computer-readable medium containing computer program code that, when executed, performs an operation. The operation includes determining user identification information identifying a user account within a computer game. Additionally, the operation includes establishing communications with a first physical device associated with the user account. The operation further includes, in response to an in-game event within the computer game, configuring the first physical device to detect a first out-of-game activity by configuring the first physical device with one or more conditions that are satisfied when data collected using one or more sensors of the first physical device exceeds a defined threshold value, and that, when satisfied, indicate the first out-of-game activity is completed. The operation also includes, upon receiving, from the first physical device, an indication that the out-of-game activity has been completed, affecting one or more gameplay attributes of the computer game for the user account, based on the completed out-of-game activity.

Another embodiment provides a system that includes a processor and a memory containing computer program code that, when executed, performs an operation. The operation includes determining user identification information identifying a user account within a computer game. Additionally, the operation includes establishing communications with a first physical device associated with the user account. The operation further includes, in response to an in-game event within the computer game, configuring the first physical device to detect a first out-of-game activity by configuring the first physical device with one or more conditions that are satisfied when data collected using one or more sensors of the first physical device exceeds a defined threshold value, and that, when satisfied, indicate the first out-of-game activity is completed. The operation also includes, upon receiving, from the first physical device, an indication that the out-of-game activity has been completed, affecting one or more gameplay attributes of the computer game for the user account, based on the completed out-of-game activity.

Still another embodiment provides a method that includes determining user identification information identifying a user account within a computer game. The method further includes establishing communications with a first physical device associated with the user account. Additionally, the method includes, in response to an in-game event within the computer game, configuring the first physical device to detect a first out-of-game activity by configuring the first physical device with one or more conditions that are satisfied when data collected using one or more sensors of the first physical device exceeds a defined threshold value, and that, when satisfied, indicate the first out-of-game activity is completed. The method further includes, upon receiving, from the first physical device, an indication that the out-of-game activity has been completed, affecting one or more gameplay attributes of the computer game for the user account, based on the completed out-of-game activity.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 7 is a block diagram illustrating an action disc device, according to one embodiment described herein.

DETAILED DESCRIPTION

It is fairly commonplace for users with an affinity towards a particular item of interest (e.g., a movie, a team of super heroes, a brand, etc.) to own both physical and virtual products affiliated with the particular item of interest. For example, a user who is a fan of a particular team of fictional superheroes may own physical toys depicting members of the team and may own computer games that include virtual depictions of the superheroes. While some conventional computer games may have limited interactions with physical elements (e.g., a game played in an augmented reality space, a game controller that provides haptic feedback) and may allow for limited interactions between virtual and physical elements (e.g., haptic feedback provided by a game controller), these games do not truly allow the user to bring the game into the physical environment. However, it is preferable to improve the interactivity between various physical products and computer games, as doing so can enhance the immersiveness of the user experience and can thus enhance the user's enjoyment of both the various physical products and games. This, in turn, can increase the sales of the physical products and games.

As such, embodiments generally provide techniques for integrating a physical game into a computer game. More specifically, embodiments include systems, methods and articles of manufacture for creating out-of-game objectives for a computer game. One embodiment includes determining user identification information identifying a user account within a computer game. Additionally, embodiments establish communications with a physical device associated with the user account. For example, the physical device could be connected to a base station, which in turn is connected to a game system on which the computer game is executing. Embodiments can configure the physical device to detect a first out-of-game activity by configuring the physical device with one or more conditions that are satisfied when data collected using one or more sensors of the physical device exceeds a defined threshold value, and that, when satisfied, indicate the first out-of-game activity is completed. In one embodiment, the physical device is configured in response to an in-game event within the computer game. Upon receiving an indication from the physical device indicating that the out-of-game activity has been completed, embodiments affect one or more gameplay attributes of the computer game for the user account, based on the completed out-of-game activity. Doing so extends the virtual world into the physical environment by enabling users to influence the virtual world through the performance of physical activities within the physical environment.

Figure 1:
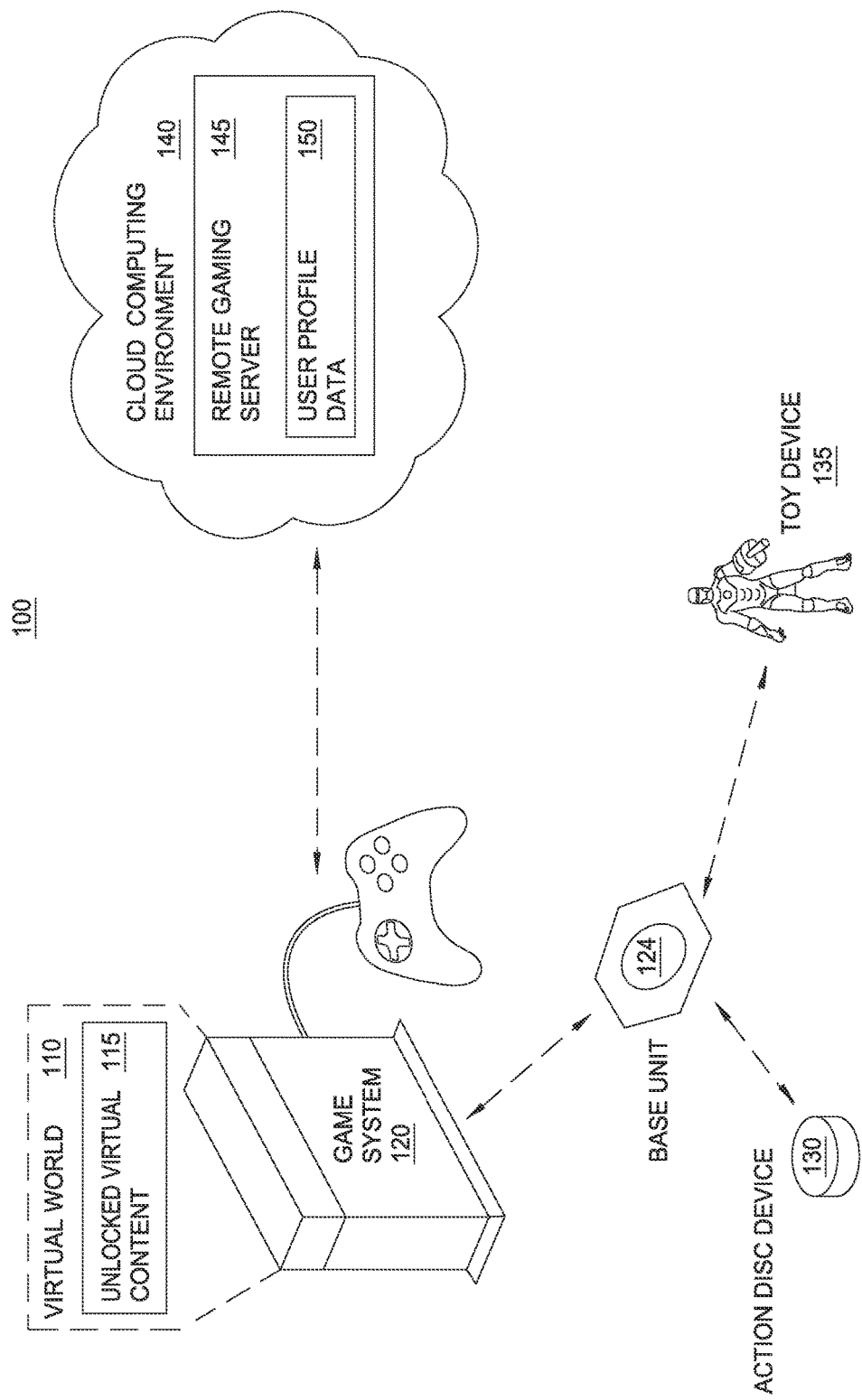
FIG. 1 is a diagram illustrating a system for extending a computer game into a physical environment, according to one embodiment described herein.

FIG. 1 is a diagram illustrating a system for extending a computer game into a physical environment, according to one embodiment described herein. As shown, the system 100 includes a game system 120, connected to a base unit 124, an action disc device 130, a toy device 135 and a cloud computing environment 140 hosting a remote gaming server 145. The remote gaming server 145 includes user profile data 150 describing user accounts. The game system 120 provides a virtual world 110. The virtual world 110 includes unlocked virtual content 115. Generally, the base unit 124 facilitates communication between the game system 120 and the toy device 135 and/or action disc device 130. For example, the base unit 124 could communicate with the action disc device 130 (or, in some embodiments, toy device 135) using wireless communications, e.g., radio-frequency identification (RFID). In one embodiment, the base unit 124 communicates with the game system 120 using wired communications, e.g., universal serial bus (USB) communications.

The game system 120 can be configured with a physical game management component (not shown) which generally manages out-of-game objectives for a computer game on the game system 120. For instance, the physical game management component can determine user identification information identifying a user account within a computer game. As an example, the user identification information could be determined based on a user currently logged into the game system 120. Additionally, the physical game management component can establish communications with a physical device (e.g., toy device 135) associated with the user account. For example, the physical game management component could identify the toy device 135 based on the toy device 135 being connected to the base unit device 124, which in turn is connected to the game system 120.

In one embodiment, game logic (not shown) executing on the game system 120 is configured to unlock the unlocked virtual content 115, upon first syncing the toy device 135 with a particular game on the game system 120 using the base unit 124. For instance, a user could purchase the toy device 135 at a retailer and could sync the toy device 135 with the game system 120 using the base unit 124 in order to unlock a virtual character corresponding to the toy device 135. As an example, a user could sync an Iron Man® action figure toy device 135 with the game system 120 to unlock the Iron Man® character within a game executing on the game system 120. As part of such an operation, the game logic could retrieve identification information (e.g., a unique identifier) from the toy device 135 and could authenticate the identification information with the remote game server 145 (e.g., over a communications network, such as the Internet). Upon authenticating the toy device 135, the game logic could unlock the unlocked virtual content 115 for use by the user's account. The remote gaming server 145 could further update the user profile data 150 to reflect the unlock virtual content for the user's account.

Moreover, in response to an in-game event within the computer game on the game system 120, the physical game management component could configure the toy device 135 to detect an out-of-game activity as part of a physical game. For instance, the physical game management component could configure the toy device 135 with one or more conditional statements based on data collected using one or more sensors of the toy device 135 (e.g., sensor data exceeding a defined threshold value, data matching a defined target value, etc.), and that, when satisfied, indicate the out-of-game activity is completed. As an example, a particular game could task a user with carrying the toy device to a particular geographic location (e.g., a particular ride within a theme park) and the toy device 135 could use a global positioning system (GPS) receiver to determine when the toy device 135 reaches the particular geographic location.

In some embodiments, the toy device 135 may lack the sensors and/or processing capabilities to detect out-of-game activities. In such an embodiment, the physical game management component can configure action disc device 130 to perform the out-of-game activity detection operation. Generally, the action disc device 130 represents a device that can be configured to detect out-of-game activities using sensors of the action disc device 130. Such a device is advantageous, as users can use such a device to add intelligence and functionality (e.g., the ability to detect and respond to out-of-game activities) to toy devices that otherwise lack the processing capabilities to perform the functionality on their own. Additionally, as the processing resources and sensors needed to perform this additional functionality may be relatively expensive to produce, use of the action disc device 130 can generally reduce the cost to users. For instance, while a user may a substantial number of different toy devices, the user may only play with a smaller number of the toy devices at any one moment in time. As such, by using the action disc device 130, the user can purchase less expensive toy devices that lack the processing capabilities to detect out-of-game activities, while using the action disc device 130 to add this functionality to the devices the user is currently playing with. Moreover, since users typically play with only a smaller number of toy devices at a time, the users may purchase a smaller number of action disc devices 130, with the end result being a cost savings for the users.

Generally, the action disc device 130 can include with a mechanical connector for removably coupling the action disc device 130 to the toy device 135. For example, the action disc device 130 could include a mechanical connector that can removably couple to a mechanical connector on the toy device 135. Examples of the mechanical connectors on the action disc device 130 and toy device 135 include, without limitation, a male/female connector, a clip, a latch, and so on. More generally, any connector mechanism for attaching the action disc device 130 and toy device 135 can be used, consistent with the functionality herein.

The toy device 135 (or the action disc device 130), once configured, can monitor for the performance of the out-of-game event using one or more sensors of the toy device 135 (or the action disc device 130). For instance, a physical game component (not shown) on the toy device 135 (or the action disc device 130) could monitor data collected using the one or more sensors to determine when the data matches a predefined threshold. As an example, a particular physical game could task the user with bringing the toy device 135 into a very dark room, and the physical game component could be configured to detect when a light sensor on the toy device 135 (or the action disc device 130) detects a level of brightness less than a predefined threshold level of brightness. Upon detecting a sufficiently low level of brightness using the light sensor, the physical game component could determine the out-of-game event is completed.

Upon receiving, from the toy device 135 or from the action disc device 130, via the base unit 124, an indication that the out-of-game activity has been completed, the physical game management component could affect one or more gameplay attributes of the computer game for the user account, based on the completed out-of-game activity. For example, a user avatar within the virtual world 110 could be granted rewards, such as experience points, skill points, ability points, in-game currency and so on. Moreover, upon receiving an indication that the out-of-game event is completed, the physical game management component could unlock additional virtual content 115 within the virtual world 110 for the user account associated with the physical game. Generally, any form of virtual content 115 can be unlocked responsive to the completion of the physical game. Examples of such content include, without limitation, playable virtual characters, virtual objects, visual modifications for the user's avatar, abilities for the user's avatar, and so on. Advantageously, embodiments allow the gameplay of the virtual world 110 to be extended into the physical world using the action disc device 130 and toy device 135, thereby providing a more immersive play experience for the user and further integrating the game system 120 with the toy device 135.

Figure 2:
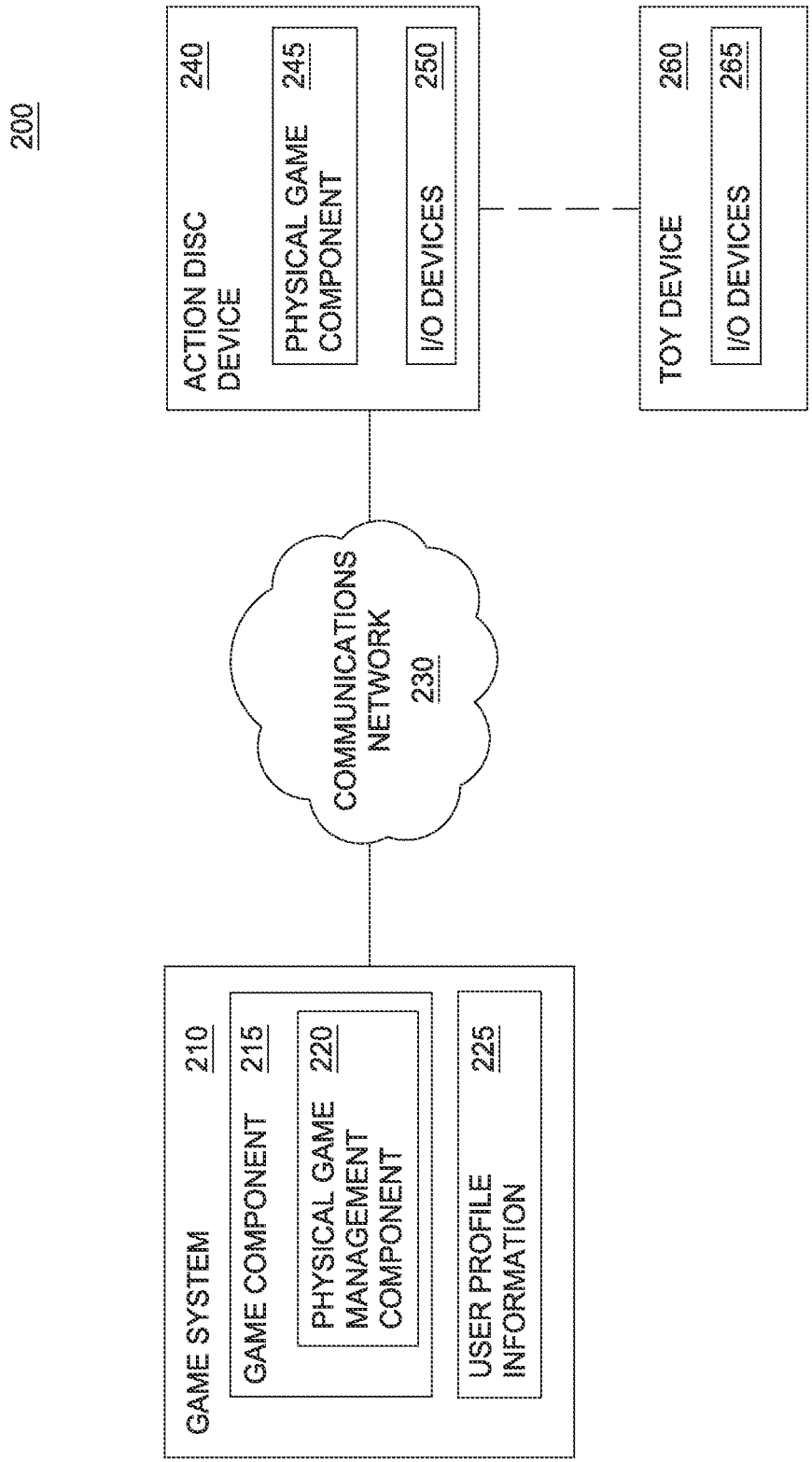
FIG. 2 is a block diagram illustrating a system configured with a physical game management component, according to one embodiment described herein.

FIG. 2 is a block diagram illustrating a system configured with a physical game management component, according to one embodiment described herein. As shown, the system 200 includes a game system 210 and an action disc device 240, interconnected via a communications network 230. Additionally, the action disc device 240 is connected with a toy device 260. The game system 210 includes a game component 215 and user profile information 225. The game component 215 generally represents a computer game executing on the game system 210. Generally, the game system 210 represents any computing device(s) capable of executing a computer game. Examples of the game system 210 include, without limitation, console gaming systems (e.g., Microsoft® Xbox One™, Sony® PlayStation® 4, etc.), mobile gaming systems (e.g., Nintendo® 3DS®, etc.), mobile devices, tablet devices, personal computers and so on. The user profile information 225 generally relates to user accounts associated with the game system 210. In authenticating users logging into the various user accounts, the game system 210 may communicate with a remote server (not shown) in order to validate the user credentials (e.g., login and password information).

Generally, the physical game management component 220 is configured to manage out-of-game objectives for the game component 215. For instance, the physical game management component 220 could identify the toy device 260 coupled to the action disc device 240. For instance, the physical game management component 220 could transmit a request to an API of the action disc device 240 over the network 230, and in response, logic on the action disc device 240 could retrieve identification information from the toy device 260 (e.g., stored in a memory of the toy device 260 and accessible over the connection between the action disc device 240 and the toy device 260). The action disc device 240 could then return the identification information to the physical game management component 220.

In response to an in-game event within the virtual world provided by the game component 215, the physical game management component 220 can configure the action disc device 240 to detect an out-of-game activity by configuring the physical game component 245 with one or more conditions that are satisfied when data collected using one or more sensors (i.e., within I/O devices 250) of the action disc device 240 exceeds a defined threshold value, and that, when satisfied, indicate the out-of-game activity is completed. Examples of the out-of-game activity include, without limitation, taking the toy device 260 (while coupled to the action disc device 240) to a physical environment having particular visual and/or acoustical characteristics (e.g., a particularly dark location, a particularly loud location, a particularly quiet location, etc.), bringing the toy device 260 (while coupled to the action disc device 240) to a particular geographic location (e.g., based on GPS coordinates determined using a GPS receiver I/O device 250), a particular user action being performed in the presence of the toy device 260 coupled to the action disc device 240 (e.g., a user singing a particular song or performing a particular dance, as detected using I/O devices 250 such as camera sensors and/or microphone sensors), having the toy device 260 (while coupled to the action disc device 240) interact with a particular number of other similarly configured toy devices (e.g., detected based on the action disc device 240 coming into close proximity with other action disc devices), and so on. More generally, any sort of out-of-game event that is capable of being detected using one or more sensors can be used, consistent with the present disclosure.

Generally, the physical game management component 220 can use the identification information of the toy device 260 in configuring the action disc device 240. For example, the identification information could identify the toy device 260 as an Iron Man® toy device, and the physical game management component 220 could select an out-of-game event for the user to perform that is thematically related to the Iron Man® character. As another example, the physical game management component 220 could configure the physical game component 245 on the action disc device 240 to perform thematically appropriate user feedback operations upon detecting the out-of-game event has been performed, based on the identity of the toy device 260. For instance, the physical game management component 220 could configure the physical game component 245 to output a particular sound effect corresponding to the character Iron Man® (e.g., a sound representing the firing of a repulsor ray), based on a determination that the toy device 260 is an Iron Man® toy device.

Upon receiving, from the physical game component 245 on the action disc device 240, an indication that the out-of-game activity has been completed, the physical game management component 220 can affect one or more gameplay attributes of the virtual world provided by the game component 215, based on the completed out-of-game activity. For example, upon determining that the out-of-game activity has been completed, the physical game management component 220 could provide a reward within the virtual world provided by the game component 215 (e.g., to a user avatar or account associated with the performed out-of-game activity). For example, the physical game management component 220 could grant a user avatar a number of experience points or an amount of in-game currency, based on the performance of the out-of-game activity. Other examples of rewards include unlocking an achievement within the computer game and completing a mission or quest within the virtual world. Doing so allows gameplay experience of the game component 215 to extend into the physical world using the toy device 260, thereby providing a more immersive and enjoyable user experience.

As discussed above, the physical game component 245 could provide feedback upon determining that an out-of-game event is completed. For example, the physical game component 245 could provide feedback using the I/O devices 250 of the action disc device 240. Examples of such feedback include visual feedback (e.g., using one or more light source I/O devices 250), haptic feedback (e.g., using a vibration motor), auditory feedback (e.g., using one or more speakers), and so on. In one embodiment, the physical game component 245 is configured to output feedback on the toy device 260. For example, the physical game component 245 on the action disc device 240, upon determining that an out-of-game event has been completed, could provide visual user feedback by causing one or more light I/O devices 265 within the toy device 260 to activate.

Generally, a variety of different techniques could be used to activate the I/O devices 265 within the toy device 260. For instance, the toy device 260 could include optical fibers coupled to the connector that removably couples the toy device 260 with the action disc device 240. Likewise, the action disc device 240 could include a connector that is coupled to an optical fiber which connects to a light-emitting device within the action disc device 240. For purposes of this example, assume that the optical fiber within the toy device 260 terminates behind the toy device's eyes, and further assume that the eyes are made from a transparent or semi-transparent material which allowing light to pass through and be seen by a user. The connectors on the action disc device 240 and toy device 260 can be configured such that, when connected to one another, light passes from the optical fiber within the action disc device 240 into the optical fiber of the toy device 260. As such, in order to achieve the glowing effect in the toy device's eyes, the action disc device 240 can activate the light-emitting device, which generates light that passes into the optical fiber within the action disc device 240. The light then travels to the optical fiber within the toy device, by way of the connectors, until the light is ultimately emitted behind the toy device's eyes, where it can be seen through the transparent material of the eyes.

In another embodiment, the physical game component 245 can transmit a signal to the toy device 260 by way of the connectors that causes one or more light emitting diodes (LEDs) within the toy device 260 to illuminate. For example, the I/O devices 265 within the toy device 260 could include LEDs coupled to a memory bus of the toy device. In order to provide the visual feedback in response to the completed out-of-game event, the physical game component 245 could manipulate the signal being sent across the memory bus in order to provide power to the LEDs within the toy device. For example, the physical game component 245 could add a DC offset to the data modulation signal (i.e., the square wave) being sent across the memory bus, sufficient to power the LEDs in the toy device 260. As another example, the physical game component 245 could change the voltage spread between the highs and lows of the data modulation signal being sent across the memory bus, in order to increase the average voltage passing across the bus to a voltage sufficient to power the LEDs within the toy device.

In one embodiment, the toy device is configured with a power source (e.g., a battery) to provide power to the LEDs. In such an embodiment, the circuit connecting the LEDs with the power source could include a switch that, upon receiving a sufficient voltage, completes the circuit and provides power to the LEDs. In such an example, the physical game component 245 can provide sufficient power to activate the switch through the connectors coupling the action disc device 240 with the toy device 260, thereby completing the circuit and activating the LEDs. More generally however, it is broadly contemplated that the physical game component 245 can use any technique and/or configuration capable of powering the LEDs (or any other I/O devices 265 within the toy device 260), consistent with the present disclosure.

In another embodiment, separate power connections (not shown) can be provided from each of the LED devices 265 to the connector within the toy device 260. Here, rather than powering the LEDs over a memory bus (or completing a circuit, using the memory bus, that powers the LEDs), the physical game component 245 could directly power each of the LEDs by transmitting power through the corresponding pin of the connector in the action disc device 240, into the connector of the toy device 260, and across the separate power connection to the respective LED within the toy device 260. Such an embodiment may be preferable, for instance, where the toy device 260 includes multiple light sources and it is desirable for the action disc device 240 to have the capability to activate only a subset of the multiple light sources within the toy device 260 at any particular point in time.

Figure 3:
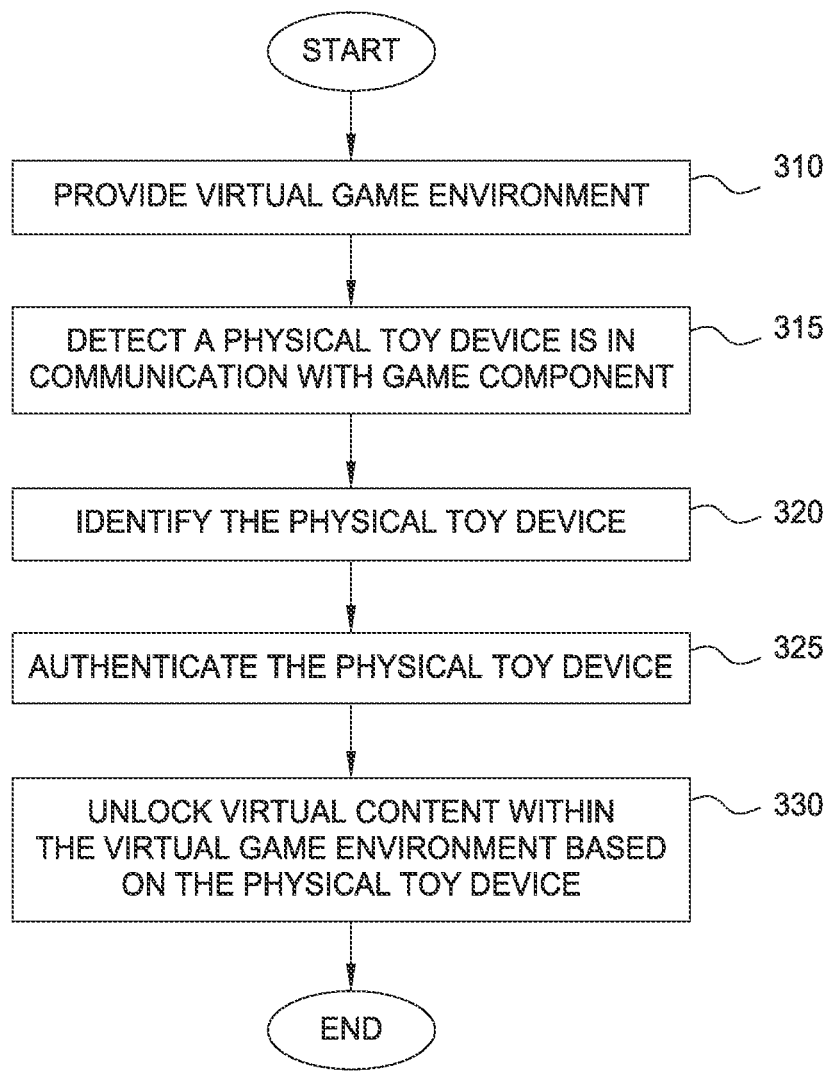
FIG. 3 is a flow diagram illustrating a method for unlocking virtual content within a virtual game environment based on real-world events, according to one embodiment described herein.

FIG. 3 is a flow diagram illustrating a method for unlocking virtual content within a virtual game environment based on real-world events, according to one embodiment described herein. As shown, the method 300 begins at block 310, where a game component 215 provides a virtual game environment. Generally, it is contemplated that any sort of game environment (also referred to herein as a virtual world) can be provided, consistent with the functionality described herein. A physical game management component 220 subsequently detects a physical toy device is in communication with the game component 215 (block 315). For example, the physical toy device (e.g., toy device 135) could be in communication with a base unit (e.g., base unit 124) through any suitable communications link (e.g., a wired communication link, a wireless communication link, etc.). The base unit, in turn, could be communicatively coupled to the game system on which the game component 215 is executing. In one embodiment, the toy device is configured to communicate directly with the game system on which the game system 215 is executing. More generally, it is contemplated that any suitable form of communications can be used, and the provided examples are for illustrative purposes only and without limitation.

The physical game management component 220, upon detecting the toy device in communication with the game component 215, identifies the toy device (block 320). For example, the physical game management component 220 could retrieve a unique identifier from the toy device using the communications link (e.g., by reading the unique identifier from a predefined memory location on the toy device, by submitting a request to an application programming interface (API) provided by the toy device, etc.). In one embodiment, the unique identifier corresponds to a class of the toy device and identifies the toy device as a member of the class. For instance, the physical game management component 220 could maintain a mapping of class identifiers to device classes, and an Iron Man® toy device could be configured with an identifier corresponding to the Iron Man® class of device. In such an example, the physical game management component 220 could retrieve the class identifier from the toy device and could reference the mapping of class identifiers using the retrieved class identifier to determine the particular toy device is an Iron Man® toy device.

In one embodiment, the physical game management component 220 is configured to retrieve the toy device's burned-in Media Access Control (MAC) address as the device's unique identifier and to use the MAC address to identify the device. For example, the physical game management component 220 could retrieve the device's MAC address and could access a device directory (e.g., hosted at a remote server) to determine the device's identity (e.g., a class of toy device that the connected toy device belongs to). Of course, these examples are provided for illustrative purposes only and without limitation, and more generally any technique for identifying the toy device can be used, consistent with the present disclosure.

In the depicted embodiment, the physical game management component 220 also authenticates the toy device (block 325). For example, the physical game management component 220 could retrieve the unique identifier from the toy device along with a preconfigured security token (e.g., written to memory of the toy device by a manufacturer of the toy device). The physical game management component 220 could then access a mapping of unique identifiers to preconfigured security tokens (e.g., hosted on a remote web site using manufacturer-provided data) to authenticate the toy device. For instance, in this example, the physical game management component 220 could send the unique identifier and preconfigured security token retrieved from the toy device to a remote server, and logic on the remote server could compare the retrieved preconfigured security token with a corresponding security token in the mapping of unique identifiers to security tokens to authenticate the device (i.e., matching tokens indicate the toy device is successfully authenticated).

The physical game management component 220 then unlocks virtual content within the virtual game environment provided by the game component 215 (block 330), and the method 300 ends. In one embodiment, the physical game management component 220 is configured to unlock virtual content for a particular user of the virtual world. For example, the physical game management component 220 could be configured to unlock virtual content (e.g., a playable character, virtual items, virtual character abilities, etc.) for a particular user account that is currently logged when a new toy device is first connected to the game component 215 and successfully authenticated.

Additionally, the physical game management component 220 can be configured to unlock content within the virtual world, responsive to the completion of an out-of-game action completed using the toy device. For instance, certain toy devices may include input/output (I/O) sensors capable of detecting the performance of the out-of-game action. Examples of such I/O sensors include, without limitation, microphones, camera sensors, infrared sensors, luminosity sensors, and so on. The physical game management component 220 could then configure the toy device to use the I/O sensors to monitor for the completion of one or more out-of-game event conditions. Upon detecting the out-of-game event is completed, based on data collected using one or more of the I/O sensors, the logic on the toy device could transmit a message to the physical game management component 220 indicating the out-of-game event is completed. The physical game management component 220, upon receiving the message, could unlock virtual content for a user corresponding to the completed out-of-game event.

Figure 4:
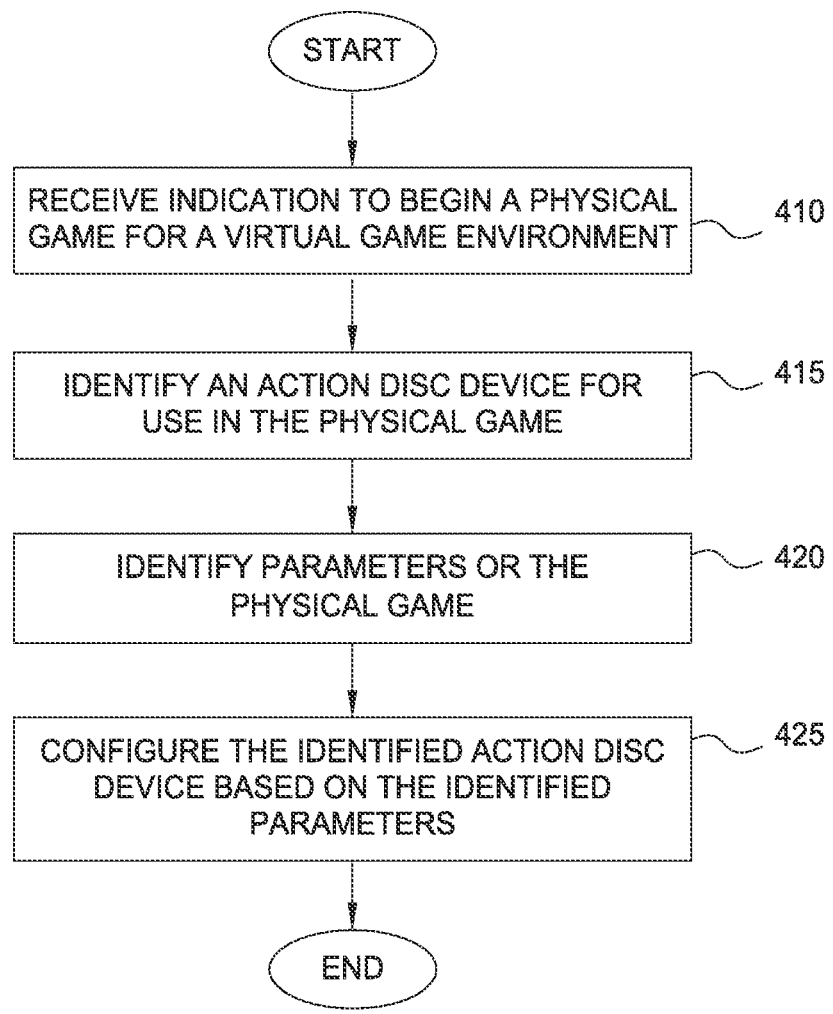
FIG. 4 is a flow diagram illustrating a method for configuring a physical device for use in a physical game for a virtual game environment, according to one embodiment described herein.

However, other toy devices may lock the logic or I/O sensors for detecting the performance of the out-of-game event. For these devices, the physical game management component 220 can be configured to configure an action disc device associated with the toy devices to detect the performance of the out-of-game event. FIG. 4 is a flow diagram illustrating a method for configuring a physical device for use in a physical game for a virtual game environment, according to one embodiment described herein. As shown, the method 400 begins at block 410, where the physical game management component 220 receives an indication to begin a physical game for a virtual environment. In one embodiment, the physical game management component 220 further receives information specifying a user account associated with the physical game. For example, the request to begin the physical game could be initiated responsive to a user action within the computer game. Examples of such a user action include, without limitation, an interaction with a virtual object or character within the virtual world, a selection from a graphical user interface of the computer game, connection of the toy device to the game system hosting the physical game management component 220, and so on. In addition to initiating the physical game, the user action can specify which physical game (of potentially multiple, distinct physical games) to play.

The physical game management component 220 identifies an action disc device for use in playing out the physical game (block 415). The physical game management component 220 identifies parameters of the particular physical game to be played using the action disc device (block 420). Generally, each physical game includes one or more out-of-game events that, when satisfied, signify the completion of the physical game, and the physical game management component 220 could identify the one or more out-of-game events that correspond to the particular physical game to be played out using the action disc device. The physical game management component 220 then configures the action disc device based on the identified parameters (block 425) and the method 400 ends.

For example, a physical game could ask the user to bring the toy device to a dark room, and this could be represented by an out-of-game event of an environmental luminosity value being below a threshold level of luminosity. As such, the physical game management component 220 could configure the action disc device to detect (e.g., using a luminance sensor on the action disc device) when the action disc device is within a physical environment having an environmental luminosity value below the threshold level of luminosity. As another example, another physical game could task the user with bringing the toy device to a particular geographic location (e.g., a particular attraction within a theme park), and such a task could be represented by an out-of-game event specifying a particular geographic location (e.g., using GPS coordinates). Accordingly, the physical game management component 220 could configure the action disc device to detect when the action disc device is located in a physical location having specified GPS coordinates (e.g., based on a reading from a GPS transceiver device on the action disc device). As yet another example, a physical game could task the user with singing a particular song and could be represented by an out-of-game event specifying audio characteristics corresponding to the particular song. In this example, the physical game management component 220 could configure the action disc device with an out-of-game event to detect when audio input data (e.g., captured using one or more microphone sensors of the action disc device) matches the specified audio characteristics corresponding to the particular song.

Figure 5:
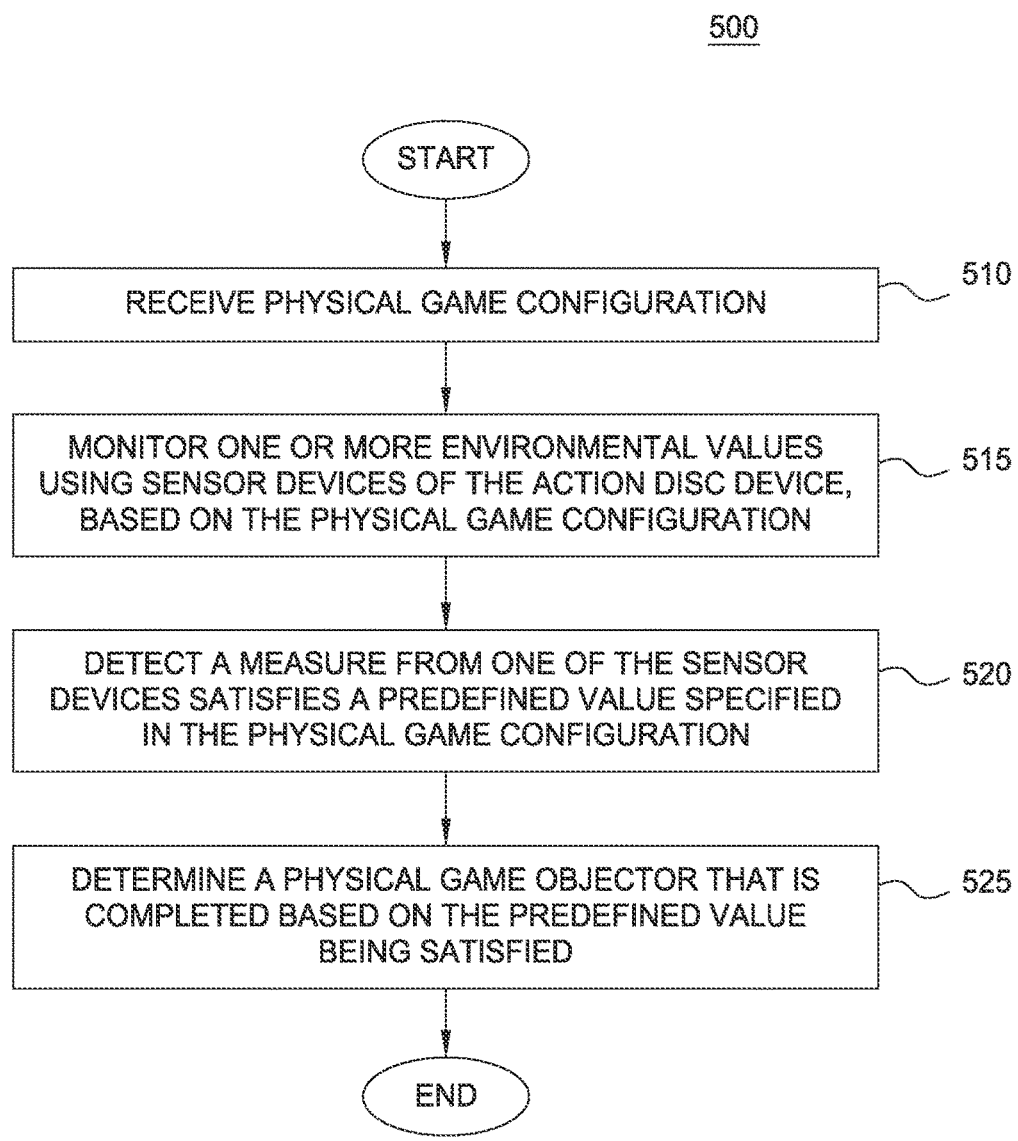
FIG. 5 is a flow diagram illustrating a method for detecting performance of a physical event during a physical game for a virtual game environment, according to one embodiment described herein.

FIG. 5 is a flow diagram illustrating a method for detecting performance of a physical event during a physical game for a virtual game environment, according to one embodiment described herein. As shown, the method 500 begins at block 510, where the physical game component 245 on an action disc device receives physical game configuration information from a physical game management component 220. Generally, as discussed above, the physical game configuration information includes one or more out-of-game events, each specifying one or more conditional statements that, when satisfied, signify the completion of the respective out-of-game event.

The physical game component 245 monitors one or more environmental values using sensor devices of the action disc device, based on the physical game configuration information (block 515). A variety of different sensors can be used in monitoring for the completion of the one or more out-of-game events. Examples include, without limitation, a luminance sensor, a camera sensor, a microphone sensor, a GPS transceiver, a temperature sensor, an accelerometer, and so on.

In the depicted embodiment, the physical game component 245 on the action disc device detects a measure from one of the sensors satisfies a predefined value specified in the physical game configuration (block 520). The physical game component 245 then determines a physical game objective that is completed based on the predefined value being satisfied (block 525), and the method 500 ends. For example, in a physical game having an out-of-game event where the user is tasked with bringing the toy device coupled to the action disc device to a sufficiently dark room, the physical game component 245 could detect that a luminance value detected using a luminance sensor is less than a predefined threshold level of luminance and accordingly could determine that the corresponding out-of-game event has been satisfied. As another example, in a physical game including an out-of-game event where the user is tasked with singing a particular song, the physical game component 245 could detect that audio data recorded using a microphone of the action disc device matches a predefined audio signature specified by one of the out-of-game events and accordingly could determine that the corresponding out-of-game event is satisfied.

Figure 6:
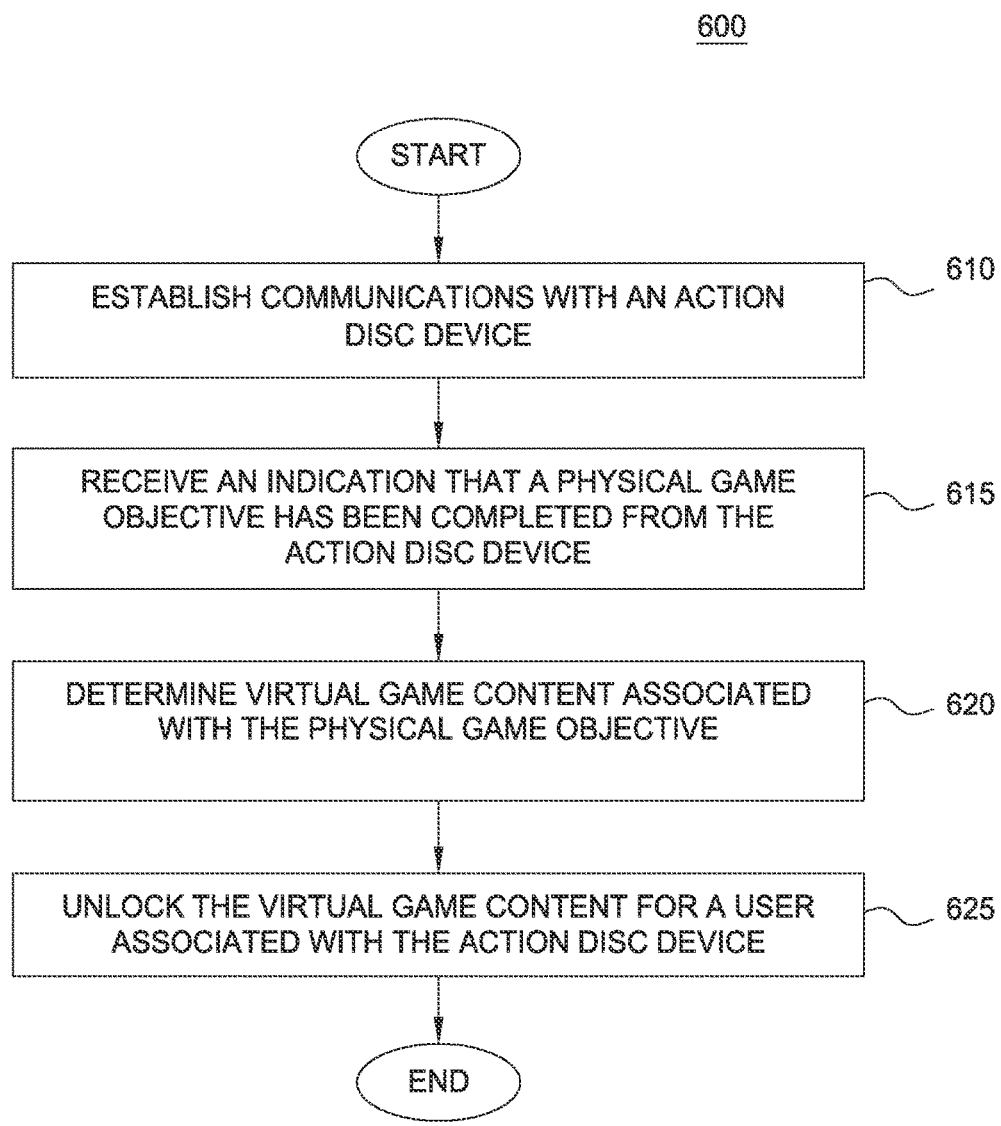
FIG. 6 is a flow diagram illustrating a method for unlocking content within a virtual game environment responsive to the performance of a physical event, according to one embodiment described herein.

At some subsequent point in time, the physical game component 245 transmits data describing the satisfied out-of-game events to the physical game management component 220. Upon receiving information describing the completed out-of-game events, the physical game management component 220 can unlock virtual content within the computer game based on the completed physical game objectives. An example of this process is shown in FIG. 6, which is a flow diagram illustrating a method for unlocking content within a virtual game environment responsive to the performance of a physical event, according to one embodiment described herein. As shown, the method 600 begins at block 610, where the physical game management component 220 establishes communication with an action disc device. For example, the action disc device could be connected (e.g., through a wired or wireless connection) to a base unit (e.g., base unit 124), which is in turn connected to the computing system on which the physical game management component 220 is executing. The physical game management component 220 receives an indication from the action disc device that a physical game objective was completed (block 615). In one embodiment, the physical game management component 220 is configured to submit a request to an API of the action disc device, requesting information specifying the completed physical game objects. For example, the physical game management component 220 could submit a request to the API of the action disc and, in response, the physical game management component 220 could receive a message over the connection to the action disc device specifying one or more out-of-game events that the physical game component 245 determined were satisfied, based on data collected using a sensor(s) of the action disc device.

The physical game management component 220 then determines virtual game content that corresponds with the completed physical game objective (block 620). Generally, a variety of different types of virtual game content can be unlocked responsive to the completion of a physical game, and the physical game management component 220 can maintain a mapping of physical game objectives to unlockable virtual game content. Examples of such unlockable content include, without limitation, virtual characters (e.g., virtual characters that, when unlocked, can be selected for play by the user), virtual objects (e.g., a virtual item that can be equipped to a user-controlled character), virtual abilities for an existing virtual character (e.g., a new offensive or defensive ability for the user-controlled character, a super power such as flight, super jumping and the like, etc.), virtual locations (e.g., a new selectable stage in which gameplay can take place) and so on.

In one embodiment, the physical game management component 220 can determine that multiple different types of virtual game content corresponds completed physical game objective. In such a situation, the physical game management component 220 can be configured to select a subset of the unlockable virtual game content to unlock, responsive to the completion of the physical game. For example, the physical game management component 220 could be configured to select (e.g., pseudo-randomly, using a predetermined ordering, etc.) one instance of unlockable virtual game content to unlock based on the completion of the physical game. The physical game management component 220 then unlocks the virtual game content for a user associated with the action disc device (block 625), and the method 600 ends. For example, the physical game management component 220 could determine that the physical game was initiated when a particular user account was logged in on the game system, and in response the physical game management component 220 could unlock the virtual game content for the particular user account.

FIG. 7 is a block diagram illustrating an action disc device, according to one embodiment described herein. As shown, the action disc device 700 includes a processor 710, storage 715, memory 720, audio I/O devices 735 (e.g., one or more speaker devices), a radio frequency (RF) transmitter 740, a camera device(s) 745, an infrared transceiver 750, an accelerometer 755 and a light-emitting device 760 (e.g., one or more light-emitting diodes (LEDs)). The action disc device 700 can further include a light sensor (not shown) for measuring a level of luminosity in the physical environment. Additionally, the action disc device 700 can include a vibration device(s) (not shown), such as a vibration motor, for providing haptic feedback. Moreover, the action disc device 700 could include a spring-loaded actuator (not shown), which can be engaged to provide haptic feedback.

Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. Further, while the depicted embodiment illustrates the components of a particular action disc device, one of ordinary skill in the art will recognize that interactive objects may use a variety of different hardware architectures. Moreover, it is explicitly contemplated that embodiments may be implemented using any device or computer system capable of performing the functions described herein.

The memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the action disc device 700. Illustratively, the memory 720 includes a physical game component 245 and an operating system 730. The operating system 730 generally controls the execution of application programs on the action disc device 700. Examples of operating system 730 include, without limitation, UNIX, a version of the Microsoft Windows® operating system, and distributions of the Linux® operating system.

Generally, the action disc device 700 provides a modular way to incorporate functionality into a compatible device (e.g., a toy action figure). For instance, the physical game component 245 on the action disc device 700 could be configured to receive physical game configuration information from a physical game management component 220, specifying out-of-game events from a physical game management component 220 and to detect the performance of the out-of-game events (e.g., using accelerometer 755, camera device(s) 745, audio I/O devices 735, etc.). Upon detecting the out-of-game event, the physical game component 245 could provide an indication to a physical game management component 220 specifying that the out-of-game event is completed. Moreover, the physical game component 245 could provide user feedback (e.g., using one or more of the light-emitting devices 215, speaker devices 220, vibration devices 225 and spring-loaded actuator 230) responsive to detecting the performance of the out-of-game event.

Advantageously, using a modular device such as the action disc device 700 allows simple, inexpensive toys to be configured to express complex behaviors and to interactively respond to their physical environment, thereby saving money relative to producing more complex toy devices including increased memory, radio-frequency (RF) circuits, and processing capabilities. Additionally, through the use of the spring-loaded actuator, the action disc device 700 can help to conserve the cost and drain of the battery (as well as the required size of the battery) by using mechanically stored energy to produce audiovisual effects. For instance, the spring-loaded actuator could be triggered using a cam motion of a low-cost toy motor whose movement causes an object placed on the actuator (e.g., a toy device) to move or fall over. Moreover, the modular nature of the action disc device 700 allows a user to reuse the capabilities of the action disc device 700 by moving the device 700 between toy devices, thus providing additional cost savings relative to incorporating the device's 700 functionality into each toy device owned by the user.

Figure 8:
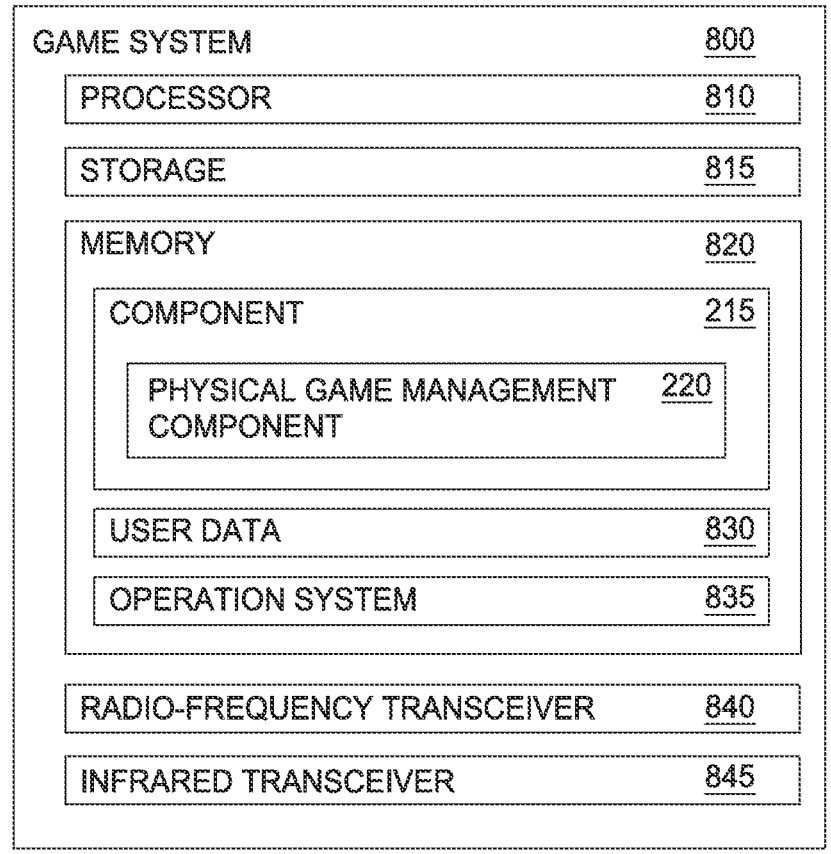
FIG. 8 is a block diagram illustrating a game system configured with a physical game management component, according to one embodiment described herein.

FIG. 8 is a block diagram illustrating a game system configured with a physical game management component, according to one embodiment described herein. As shown, the game system 800 includes a processor 810, storage 815, memory 820, radio-frequency (RF) transceiver 840 and an infrared transceiver 845. In one embodiment, the game system 800 includes a network interface controller (not shown), which can connect the game system 800 to a data communication network, e.g., a TCP/IP network such as the Internet.

Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. Further, while the depicted embodiment illustrates the components of a particular game system 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the game system 800. Illustratively, the memory 820 includes a game component 215, user data 830 and an operating system 835. The operating system 835 generally controls the execution of application programs on the game system 800. Examples of operating system 835 include, without limitation, UNIX, a version of the Microsoft Windows® operating system, and distributions of the Linux® operating system. Additional examples of operating system 856 include custom operating systems for gaming consoles, including the custom operating systems for systems such as the Nintendo® 3DS® and Sony® PSP®.

Generally, the physical game management component 245 is configured to manage out-of-game objectives for a computer game. For instance, the physical game management component 245 could determine user identification information identifying a user account within a computer game. For example, user identification information could be determined for a user account that is currently logged in within the game component 215 when a request for an out-of-game event is submitted. The physical game management component 245 identifies a first physical device that is communicatively coupled to the game system 800 (e.g., via a base unit). In response to an in-game event within the computer game, The physical game management component 245 configures the first physical device to detect a first out-of-game activity. In doing so, the physical game management component 245 may configure the first physical device with one or more conditions that are satisfied when data collected using one or more sensors of the first physical device exceeds a defined threshold value, and that, when satisfied, indicate the first out-of-game activity is completed. Upon receiving, from the first physical device, an indication that the out-of-game activity has been completed, the physical game management component 245 could affect one or more gameplay attributes within a virtual world provided by the game component 215, for the user account, based on the completed out-of-game activity.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, the physical game management component 220 could execute on a computing system in the cloud and could transmit configuration information to a connected action disc device specifying configuration information for playing a physical game. The physical game management component 220 could then receive a notification from the action disc device, indicating that an objective(s) of the physical game have been completed, and in response could unlock virtual content corresponding to the physical game objective(s). Doing so allows client devices to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing computer program code that, when executed, performs an operation to implement game attributes unlockable via real-world activities, the operation comprising:

determining user identification information identifying a user account within a computer game executing on a computer system;

establishing communications with a sensor device associated with the user account and having one or more sensors, wherein the sensor device is communicatively connected to the computer system and detachably coupled to a toy device, wherein the computer game is usable absent the toy device and the sensor device;

authenticating the toy device by communicating with an Application Programming Interface (API) of the sensor device, wherein the sensor device is configured to retrieve identification information for the toy device from a memory of the toy device;

in response to an in-game event within the computer game, configuring the sensor device to detect a first real-world activity by configuring the sensor device with one or more conditional statements for evaluating, against a defined threshold value, data collected using the one or more sensors of the sensor device, wherein the one or more conditional statements, when satisfied based on the collected data, indicate that the first real-world activity is completed; and upon receiving, from the sensor device, an indication that the first real-world activity has been completed, unlocking one or more gameplay attributes of the computer game for the user account, based on the completed real-world activity, whereafter the computer game, including the unlocked one or more gameplay attributes, is usable absent the toy device and the sensor device.

2. The non-transitory computer-readable medium of claim 1, wherein the first real-world activity comprises performance of a user action, wherein the sensor device is configured to detect that the performance of the user action has occurred based on the collected data exceeding the defined threshold value, wherein the one or more sensors include at least one of an accelerometer, a light sensor, and a microphone sensor.

3. The non-transitory computer-readable medium of claim 1, wherein the one or more sensors include a global positioning system (GPS) transceiver, wherein the first real-world activity comprises the sensor device being located at a specified geographic location, wherein the sensor device is configured to detect when a determined location of the sensor device matches the specified geographic location.

4. The non-transitory computer-readable medium of claim 1, wherein the one or more sensors include a light-detecting sensor, wherein the first real-world activity comprises the sensor device being within a physical environment having a measure of luminosity that is greater than a predefined level of luminosity, wherein the sensor device is configured to detect the measure of luminosity using based on the data collected using the light-detecting sensor.

5. The non-transitory computer-readable medium of claim 1, wherein configuring the sensor device to detect the first real-world activity further comprises:
configuring the sensor device to provide one or more forms of user feedback in response to detecting the first real-world activity.

6. The non-transitory computer-readable medium of claim 1, wherein establishing communications with the sensor device associated with the user account further comprises:
detecting the sensor device is connected to a base device in communication with the computer system; and
establishing a connection with the sensor device, through the base device.

7. The non-transitory computer-readable medium of claim 1, wherein the sensor device is usable with a plurality of toy devices of distinct types, the plurality of toy devices including the toy device, wherein the sensor device is unusable when not coupled to any toy device, wherein establishing communications with the sensor device associated with the user account comprises:
detecting the sensor device is connected to a base device in communication with the computer system; and
establishing a connection with the sensor device, through the base device.

8. The non-transitory computer-readable medium of claim 7, wherein the first real-world activity in a first instance comprises performance of a user action, wherein the sensor device is configured to detect that the performance of the user action has occurred based on the collected data exceeding the defined threshold value, wherein the one or more sensors include an accelerometer, a light-detecting sensor, a microphone sensor, and a global positioning system (GPS) transceiver.

9. The non-transitory computer-readable medium of claim 8, wherein unlocking one or more gameplay attributes of the computer game based on the completed real-world activity comprises:
identifying a first avatar, within the computer game, that corresponds to a user performing the user action, based on the determined user identification information; and
providing a reward to the first avatar within the computer game, based on the completed real-world activity.

10. The non-transitory computer-readable medium of claim 9, wherein providing the reward to the first avatar comprises:
granting, to the first avatar, one or more experience points, one or more skill points, one or more skills, a virtual item, and a cosmetic customization; and
granting gameplay content for the user account within the computer game, such that the granted gameplay content becomes accessible for the user account.

11. The non-transitory computer-readable medium of claim 10, wherein the first real-world activity in a second instance comprises the sensor device being located at a specified geographic location, wherein the sensor device is configured to detect when a determined location of the sensor device matches the specified geographic location.

12. The non-transitory computer-readable medium of claim 11, wherein the first real-world activity in a third instance comprises the sensor device being within a physical environment having a measure of luminosity that is greater than a predefined level of luminosity, wherein the sensor device is configured to detect the measure of luminosity using based on the data collected using the light-detecting sensor;
wherein configuring the sensor device to detect the first real-world activity further comprises configuring the sensor device to provide one or more forms of user feedback in response to detecting the first real-world activity.

13. A system to implement game attributes unlockable via real-world activities, the system comprising:
one or more computer processors; and
a memory containing computer program code that, when executed by the one or more computer processors, performs an operation comprising:
determining user identification information identifying a user account within a computer game;
establishing communications with a sensor device associated with the user account and having one or more sensors, wherein the sensor device is communicatively connected to the system and detachably coupled to a toy device, wherein the computer game is usable absent the toy device and the sensor device;
authenticating the toy device by communicating with an Application Programming Interface (API) of the sensor device, wherein the sensor device is configured to retrieve identification information for the sensor device from a memory of the toy device;
in response to an in-game event within the computer game, configuring the sensor device to detect a first real-world activity by configuring the sensor device with one or more conditional statements for evaluating, against a defined threshold value, data collected using the one or more sensors of the sensor device, wherein the one or more conditional statements, when satisfied based on the collected data, indicate that the first real-world activity is completed; and
upon receiving, from the sensor device, an indication that the first real-world activity has been completed, unlocking one or more gameplay attributes of the computer game for the user account, based on the completed real-world activity, whereafter the computer game, including the unlocked one or more gameplay attributes, is usable absent the toy device and the sensor device.

14. The system of claim 13, wherein the first real-world activity comprises performance of a user action, wherein the sensor device is configured to detect that the performance of the user action has occurred based on the collected data exceeding the defined threshold value, wherein the one or more sensors include at least one of an accelerometer, a global positioning system (GPS) transceiver, a light sensor, and a microphone sensor.

15. The system of claim 13, wherein the one or more sensors include a global positioning system (GPS) transceiver, wherein the first real-world activity comprises the sensor device being located at a specified geographic location, wherein the sensor device is configured to detect when a determined location of the sensor device matches the specified geographic location.

16. The system of claim 13, wherein the one or more sensors include a light-detecting sensor, wherein the first real-world activity comprises the sensor device being within a physical environment having a measure of luminosity that is greater than a predefined level of luminosity, wherein the sensor device is configured to detect the measure of luminosity using based on the data collected using the light-detecting sensor.

17. The system of claim 13, wherein configuring the sensor device to detect the first real-world activity further comprises configuring the first physical device to provide one or more forms of user feedback in response to detecting the first real-world activity.

18. The system of claim 13, wherein establishing communications with the sensor device associated with the user account further comprises:
   detecting the sensor device is connected to a base device in communication with the computer system; and
   establishing a connection with the sensor device, through the base device.

19. A computer-implemented method to implement game attributes unlockable via real-world activities, the computer-implemented comprising:
   determining user identification information identifying a user account within a computer game executing on a computer system;
   establishing communications with a sensor device associated with the user account and having one or more sensors, wherein the sensor device is communicatively connected to the computer system and detachably coupled to a toy device, wherein the computer game is usable absent the toy device and the sensor device;
   authenticating the toy device by communicating with an Application Programming Interface (API) of the sensor device, wherein the sensor device is configured to retrieve identification information for the toy device from a memory of the toy device;
   in response to an in-game event within the computer game, configuring the sensor device to detect a first real-world activity by configuring the sensor device with one or more conditional statements for evaluating, against a defined threshold value, data collected using one or more sensors of the sensor device, wherein the one or more conditional statements, when satisfied based on the collected data, indicate that the first real-world activity is completed; and
   upon receiving, from the sensor device, an indication that the first real-world activity has been completed, unlocking one or more gameplay attributes of the computer game for the user account, based on the completed real-world activity, whereafter the computer game, including the unlocked one or more gameplay attributes, is usable absent the toy device and the sensor device.

20. The computer-implemented method of claim 19, wherein the first real-world activity comprises performance of a user action, wherein the sensor device is configured to detect that the performance of the user action has occurred based on the collected data exceeding the defined threshold value, wherein the one or more sensors include at least one of an accelerometer, a global positioning system (GPS) transceiver, a light sensor, and a microphone sensor, wherein unlocking one or more gameplay attributes of the computer game based on the completed real-world activity further comprises:
   identifying a first avatar, within the computer game, that corresponds to a user performing the user action, based on the determined user identification information; and
   providing, based on the completed real-world activity, a reward within the computer game by granting, to the first avatar, at least one of one or more experience points, one or more skill points, and one or more skills.

* * * * *